United States Patent
Bhushan et al.

(10) Patent No.: US 6,504,386 B1
(45) Date of Patent: Jan. 7, 2003

(54) LIQUID DIELECTRIC CAPACITOR FOR FILM THICKNESS MAPPING, MEASUREMENT METHODS USING SAME

(75) Inventors: Bharat Bhushan, Powell, OH (US); Christopher D. Hahm, Roy, UT (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/422,376

(22) Filed: Oct. 21, 1999

Related U.S. Application Data

(60) Provisional application No. 60/156,409, filed on Sep. 28, 1999.

(51) Int. Cl.$^7$ .................. G01R 27/26; G01R 27/08; G11B 5/58
(52) U.S. Cl. .............. 324/671; 324/658; 324/663; 324/699; 369/53.41
(58) Field of Search ................ 324/671, 699, 324/701, 658, 675, 765, 649, 662, 663; 369/53.41

(56) References Cited

U.S. PATENT DOCUMENTS

| | | | | |
|---|---|---|---|---|
| RE32,457 E | * | 7/1987 | Matey | 369/53.41 |
| 5,175,505 A | * | 12/1992 | Magneau et al. | 324/671 |

OTHER PUBLICATIONS

Novotny et al., Lubricant dynamics in sliding and flying, J. Appl. Phys. 70, 1991, 5647.
Leung et al., An Optical Method Using a Laser and an Integrating Sphere Combination for Characterizing the Thickness Profile of Megnetic Media, IEEE Trans. Magn. 25, 1989, 3659.
Meeks et al., Optical Surface Analysis of the Head–Disk–Interface of Thin Film Disks, Trans. ASME 117, 1995, 112.
Jonsson et al., Measurement of rheological properties of ultrathin lubricant films at very high shear rates and near–ambient pressure, J. Appl. Phys. 78, 1995, 3107.
Hahm et al., High shear rate viscosity measurements of perfluoropolyether lubricants for magnetic thin–film rigid disks, J. Appl. Phys. 81, 1997, 5384.
Novotny et al., Lubricant Removal, Degradation, and Recovery on Particulate Magnetic Recording Media, J. Tribology 114, 1992, 61.
Bhushan, Tribology and Mechanics of Magnetic Storage Devices, 2nd Ed., Springer–Verlag, New York (entire book).
White, Viscous Fluid Flow, 2nd Ed., McGraw–Hill, New York.

\* cited by examiner

Primary Examiner—N. Le
Assistant Examiner—Anjan K. Deb
(74) Attorney, Agent, or Firm—Standley & Gilcrest LLP

(57) ABSTRACT

The present invention includes capacitive film thickness measurement devices and measurement systems used in machines or instruments. A capacitance measurement device and technique useful in determining lubricant film thickness on substrates such as magnetic thin-film rigid disks. Using the present invention, variations in lubricant thickness on the Angstrom scale or less may be measured quickly and nondestructively.

6 Claims, 15 Drawing Sheets

SECTION A-A

SMOOTH DISK COATED WITH
PARTIALLY BONDED Z-DOL

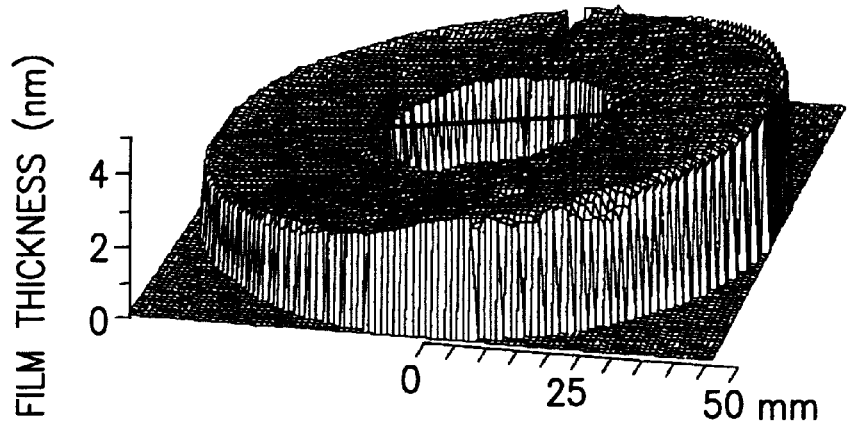
FIG-8(a)
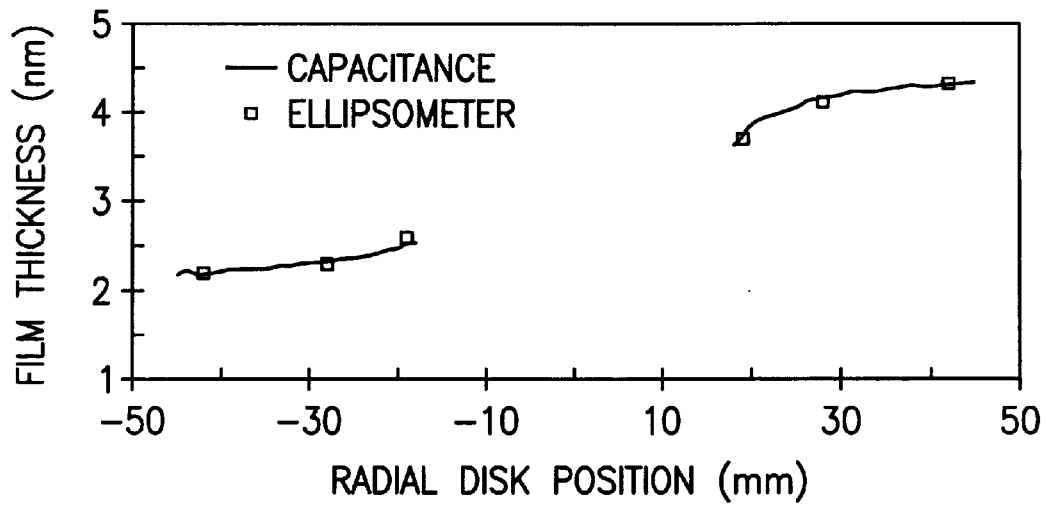
FIG-8(b)
FIG-8

LIQUID DIELECTRIC CAPACITOR FOR FILM THICKNESS MAPPING, MEASUREMENT METHODS USING SAME

This application claims benefit of provisional application Ser. No. 60/156,409 filed on Sep. 28, 1999.

TECHNICAL FIELD OF THE INVENTION

The present invention is in the field of film thickness measurement methods and film thickness measurement devices.

BACKGROUND OF THE INVENTION

This invention relates to methods of measuring film thickness. More specifically, this invention relates to a capacitive measurement method useful in determining lubricant film thickness on substrates such as magnetic disks.

Perfluoropolyether lubricants currently used on magnetic thin-film rigid disks play a crucial role in protecting the head and disk surfaces. Uniformity of the lubricant film is critical for producing disks with consistent performance. Techniques to measure film thickness presently include X-ray photoelectron spectroscopy, Fourier transform infrared spectrometry, ellipsometry, and optical surface analysis. The first three such methods produce point measurements and require a substantial amount of time to properly map a surface. The fourth method, optical surface analysis, is best suited for determining a change in surface properties and is limited in vertical resolution of lubricant film thickness in comparison to other methods.

It is thus an object of the present invention to develop a method which can quickly, nondestructively, and accurately map lubricant film thickness and characterize lubricant depletion.

Although described with respect to the field of lubricant film thickness measurements, it will be appreciated that similar advantages of quick, non-destructive measurements, as well as other advantages, may obtain in other applications of the present invention. Such advantages may become apparent to one of ordinary skill in the art in light of the present disclosure or through practice of the invention.

SUMMARY OF THE INVENTION

The present invention includes capacitive film thickness measurement devices and measurement systems. The invention also includes machines or instruments using those aspects of the invention. The present invention may be used to upgrade, repair, or retrofit existing machines or instruments of these types, using methods and components known in the art.

The present invention additionally includes methods and procedures using the devices of the present invention. The methods and procedures of the present invention may be applied using procedures and protocols known and used in the arts to which they pertain.

In broadest terms, the present invention includes a film thickness measurement device comprising: (1) a rotation-capable platform for supporting a conductive substrate, the platform adapted to rotate at varying speeds; (2) a conductive probe located sufficiently near and above a conductive substrate on the rotation-capable platform, the probe adapted to move radially from sufficiently near the axis of rotation of the conductive substrate to sufficiently near the outer edge of the conductive substrate, and/or from the outer edge to the axis of rotation; (3) a capacitance-measuring device adapted to measure capacitance between the conductive substrate and the conductive probe; and (4) a force transducer adapted to measure friction and normal forces applied to the conductive probe. The conductive probe may be comprised of a commercial slider or a metal pin immersed in a contained liquid dielectric.

Also included in the present invention is, in broadest terms, a method for measuring film thickness, the method comprising the steps of: (1) placing a film-coated conductive substrate upon a rotation-capable platform, the platform adapted to rotate at varying speeds; (2) placing a conductive probe sufficiently near and above the film-coated conductive substrate, the probe adapted to move radially from sufficiently near the axis of rotation of the film-coated conductive substrate to sufficiently near the outer edge of the film-coated conductive substrate, and/or from the outer edge towards the axis of rotation; (3) rotating the rotation-capable platform at a predetermined speed of rotation; (4) measuring the capacitance between the conductive probe and the film-coated conductive substrate over at least one rotation at the current radial probe position; (5) moving the conductive probe radially a predetermined distance toward or away from the axis of rotation; (6) measuring the capacitance between the conductive probe and the film-coated conductive substrate over at least one rotation at the new radial probe position; (7) measuring the frictional force applied to the probe over at least one rotation at the new radial probe position; (8) continuing to move the probe in steps of the predetermined distance and measuring the capactitance and frictional force at those positions until all regions of interest of the film-coated conductive substrate have been measured; and (9) using the acquired measurements of capacitance and frictional force to calculate film thickness at each region of interest.

The method for measuring film thickness may additionally comprise the step of averaging capacitance measurements taken at each radial probe position. The averaged capacitance measurements may then be used to normalize the capacitance measurements taken at each radial probe position, whereby the effect of drift in capacitance may be minimized. Also included in the method may be the step of taking an independent measurement of film thickness using an appropriate method whereby the capacitance measurement may be calibrated.

BRIEF DESCRIPTION OF THE DRAWINGS

FIG. 7 shows a perspective graphical representation of a) a typical raw capacitance measurement obtained with the liquid dielectric capacitor and b) the same measurement after averaging of each track, in accordance with the present invention.

FIG. 8 shows a) a perspective graphical representation of the film thickness of a smooth disk coated with partially bonded lubricant where the lubricant thickness is varied across the diameter of the disk obtained by increasing disk withdrawal rate during coating and b) a graphical comparison of an ellipsometer measurement along the line indicated in a) with the calibrated capacitance film thickness measurement along the same line, in accordance with the present invention.

DETAILED DESCRIPTION OF THE PREFERRED EMBODIMENTS

In accordance with the foregoing summary, the following presents a detailed description of the preferred embodiment of the invention that is currently considered to be the best mode.

The capacitance measurements of the present invention are based on a device and method to study high shear rate viscosity in relatively thick lubricant films, such as films 50–150 nm thick. Using this base method, the thickness of a lubricant film sheared between a commercial slider and disk may be determined by measuring the capacitance between the slider and disk. Friction force, the force required to shear the film, may be simultaneously measured. This base method, however, is only moderately successful on films less then 10 nm thick since slider curvature and surface roughness prevent complete wetting of the slider rails with lubricant. To alleviate this problem, a liquid dielectric capacitor is presented. In this capacitor, capacitance may be measured between the disk substrate and a small-diameter metal pin in near contact with the lubricant. The space between the pin and disk may be flooded with a liquid having a high dielectric constant. Using this or a similar type of capacitor, variations in lubricant film thickness on the order of 0.1 nm or smaller can be measured with a lateral resolution of about 100 microns.

The present invention discloses a capacitance technique using a slider as well as a technique using a liquid dielectric capacitor. In the slider measurements, a correlation may be sought between the film thickness calculated from capacitance measurements and film thickness calculated from friction force measurements. In the liquid dielectric capacitor measurements, ellipsometer measurements may be used as a means to both calibrate the capacitance measurement and compare the accuracy of the capacitance model used to calculate film thickness with actual film thickness.

Figure 1:
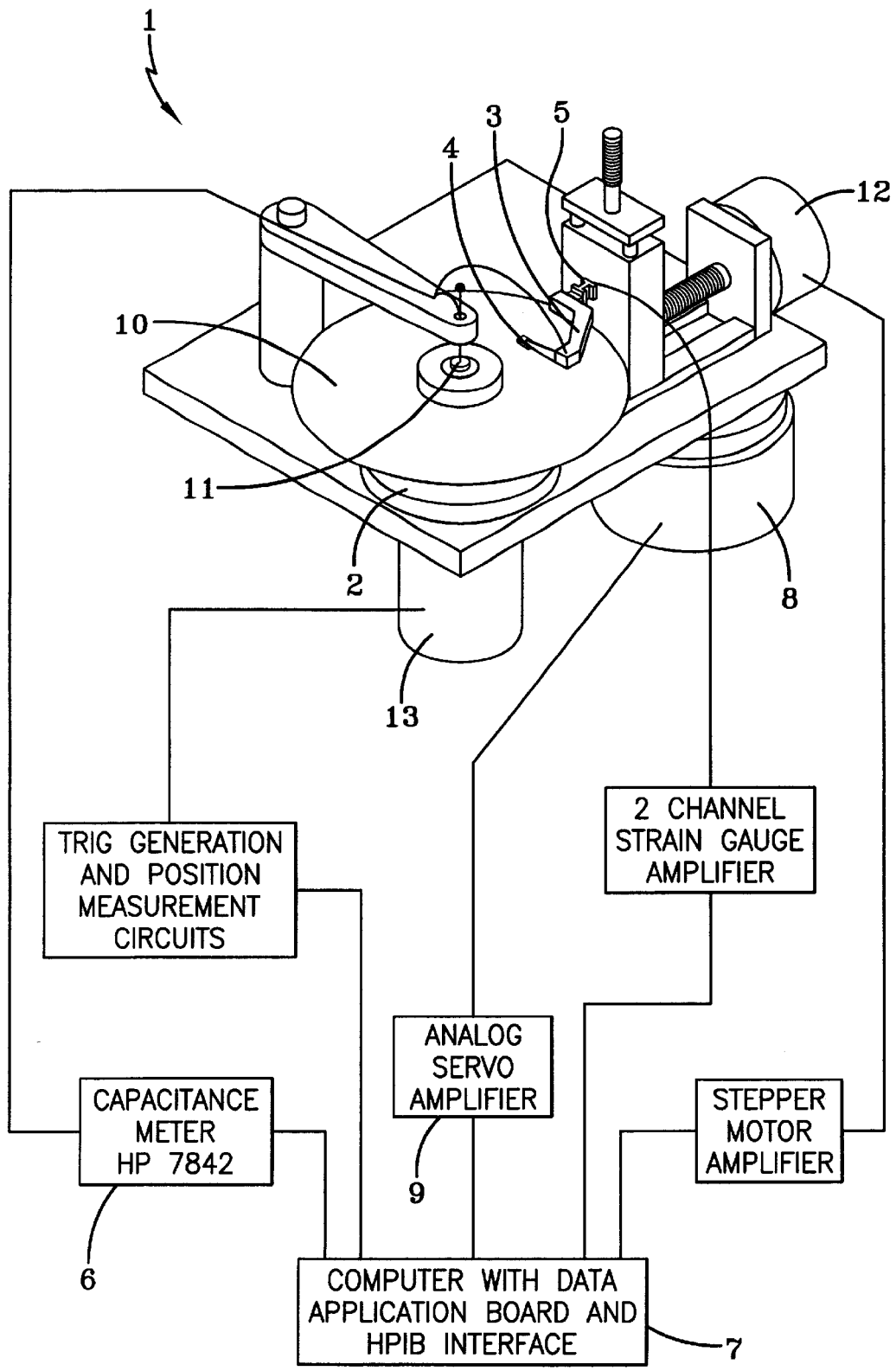
FIG. 1 is a persective view of the test apparatus.

To map the lubricant film thickness on a disk, the capacitance may be measured between a conductor in near contact with the disk and the substrate of the disk. The lubricant and carbon overcoat, between the conductor and disk substrate, may act as dielectrics and the measured capacitance may be a function of the thickness of these two layers. One embodiment of the present invention is shown in FIG. 1. Major components of the device 1 are a variable speed platform 2, a triaxial stage 3 for positioning a slider 4 or probe on the disk, a bi-axial force transducer 5, a capacitance meter 6, and a computer 7 to control the apparatus and acquire data. The platform 2 may be belt-driven by a device such as a pancake-type dc servomotor 8 with an integral tachometer and used with an analog servo or similar amplifier 9 and transformer. The platform 2 may be driven at speeds ranging from 0.1 to 500 rpm with an accuracy of 3%. A disk 10 attached to or placed on the platform 2 may be electrically isolated from the platform by an acetyl washer. An aluminum clamp that may be used to hold the disk to the platform may contain a mercury-filled cup 11. A pin dipped in this cup 11 may provide a low noise electrical contact between the disk 10, which acts as one plate of a capacitor, and the capacitance meter 6. The other plate for the capacitor may be provided by a commercial slider 4 or by a metal pin immersed within a liquid dielectric, possibly confined by a polytetrafluoroethylene (PTFE) or similar slider. The slider or liquid dielectric capacitor (described later) may be mounted on an acetyl arm, which may in turn be mounted on a biaxial force transducer 5. The force transducer 5 may use semiconductor strain gages to measure friction and normal forces. The force transducer 5 may be mounted on a triaxial stage 3, which may be positioned by a stepper motor 12. An encoder 13 attached to the platform 2 may be used to measure disk velocity and position and also to trigger the capacitance and strain gage measurements.

Capacitance measurements may be made with an HP 4278A or similar capacitance meter. This type of meter can measure from 100 pF to 100 $\mu$F with a 1 kHz oscillator frequency and from 1 pF to 1024 pF with a 1 MHz oscillator frequency. The oscillator voltage may be set from 0.1 V to 1.0 V. A sample rate of up to 50 Hz may be possible. An HPIB interface may be used for data acquisition. For the oscillator frequency and voltage used, such as 0.1 V and 1 kHz respectively, resolution may be ±0.05% of the full scale reading. In liquid dielectric capacitance measurements of a lubricant film with a mean thickness of 3.2 nm, a variation of 2 nm in film thickness produced a variation in measured capacitance of 40% of the full scale reading, indicating a resolution of better than 0.1 nm.

The dimension of the slider or pin used may determine lateral resolution of the measurement. A 1.0 mm diameter pin is preferably used for the lubricant film thickness maps while a 0.1 mm diameter pin may be used for profiling wear tracks produced as a result of drag tests. In one embodiment, disks may be measured from an outer radius of 46 mm to an inner radius of 18 mm. One thousand measurements may be made per disk revolution and once per revolution the slider may be moved inward by the stepper motor 0.9 mm. The measurement process may be continued until the inner disk radius is reached. To produce a lubricant film thickness map, a 92×92 array may be first constructed. Each element in the array preferably corresponds to one square millimeter. Every measurement may then be mapped into the element of the array corresponding to the position of the slider on the disk at the time of measurement.

Figure 2:
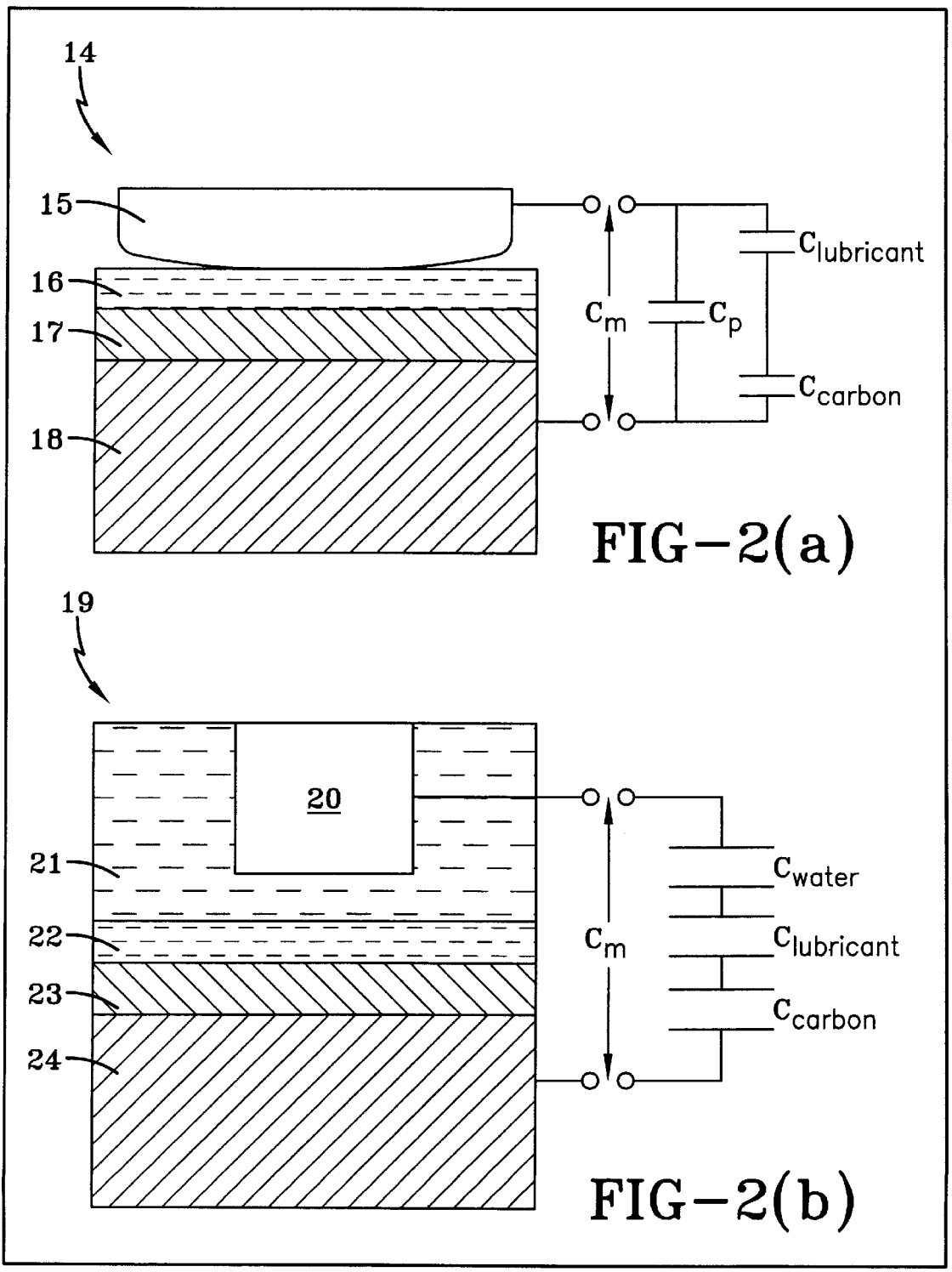
FIG. 2 is a side elevational view of a) the slider-disk interface and b) the pin-disk interface of the present invention.

In measurements with commercial sliders, friction force and capacitance between the slider and disk may be measured simultaneously. In FIG. 2a, an illustration of a slider-disk interface 14 is given along with an equivalent capacitance model. FIG. 2a shows a slider 15 in contact with the surface of a lubricant layer 16. The lubricant layer covers a carbon overcoat 17 on a magnetic substrate 18. The capacitance between the slider 15 and substrate 18 due to the area of the slider wetted by the lubricant, C, is defined as $$C_w = \frac{q}{\Delta V}$$

where q is the charge on the slider and $\Delta V$ is the potential difference between the substrate and slider. By assuming that the width and length of the wetted portion of the slider are both much greater then the spacing between the slider and substrate, edge effects may be neglected and a parallel plate capacitor model may be valid. In this model the displacement field, D, between the plates is constant. The magnitude of D is given by $$\|D\| = \frac{q}{A_w}$$

where $A_w$, is the wetted area of the slider. The relationship between D and electric field E in a material with dielectric constant $\in$ is defined by $$D = \in \varepsilon_o E$$

where E is the permittivity of free space. The difference in potential, $\Delta V$, in terms of the electric field is $$\Delta V = -\int E \cdot dl$$

Combining these equations and using a path of integration, l, normal to the disk substrate gives $$= \frac{q}{A_w \varepsilon_o} \left[ \frac{h_{carbon}}{\varepsilon_{carbon}} + \frac{h_{lubricant}}{\varepsilon_{lubricant}} \right]$$

$$\Delta V = \int_0^{h_{carbon}} \frac{\|D\|}{\varepsilon_{carbon} \varepsilon_o} dz + \int_{h_{carbon}}^{h_{carbon}+h_{lubricant}} \frac{\|D\|}{\varepsilon_{lubricant} \varepsilon_o} dz$$

where $h_{carbon}$, $\in_{carbon}$ and $h_{lubricant}$, $\in_{lubricant}$ are the film thickness and dielectric constants of the carbon and lubricant respectively. By dividing this equation by q it can be seen that the capacitance between the slider and disk substrate can be modeled as two parallel plate capacitors in series $$\frac{1}{C_w} = \frac{\Delta V}{q} = \frac{h_{carbon}}{A_w \varepsilon_o \varepsilon_{carbon}} + \frac{h_{lubricant}}{A_w \varepsilon_o \varepsilon_{lubricant}}$$

$$= \frac{1}{C_{carbon}} + \frac{1}{C_{lubricant}}$$

In addition to $C_{carbon}$ and $C_{lubricant}$, the measured capacitance, $C_m$, between the slider and substrate also contains a term $C_p$. This capacitance is due to areas of the slider that are not wetted by lubricant. $C_p$ can be modeled as lying in parallel with $C_{lubricant}$ and $C_{carbon}$, shown in FIG. 2a. Using this capacitance model and equation the above equation $C_m$ is shown to be inversely proportional to $h_{lubricant}$ $$C_m = C_w + C_p = \frac{A_w \varepsilon_{lubricant} \varepsilon_o C_{carbon}}{A_w \varepsilon_{lubricant} \varepsilon_o + h_{lubricant} C_{carbon}} + C_p$$

The measured friction force, F, is also inversely proportional to $h_{lubricant}$ and given as $$F = \frac{\eta_o A_w v}{h_{lubricant}}$$

where $\eta_o$, is the absolute viscosity of the lubricant and v is the relative velocity of the disk.

Figure 3A:
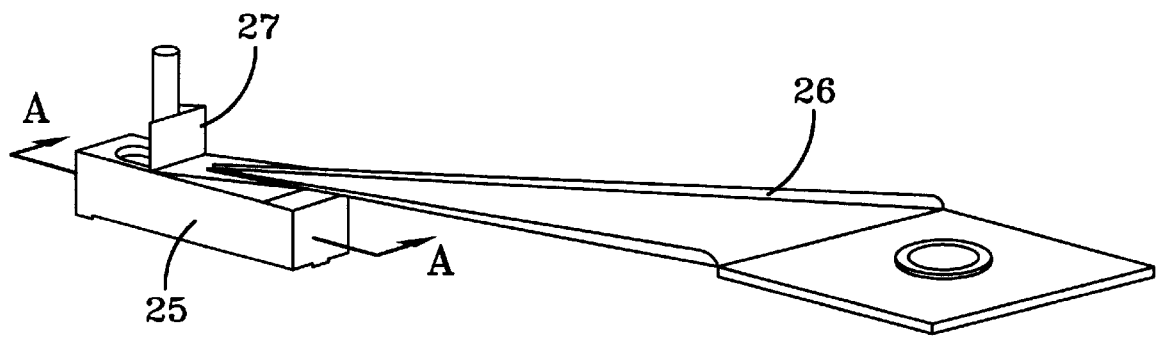
FIG. 3a is a perspective view of the liquid dielectric capacitor of the present invention.
Figure 3B:
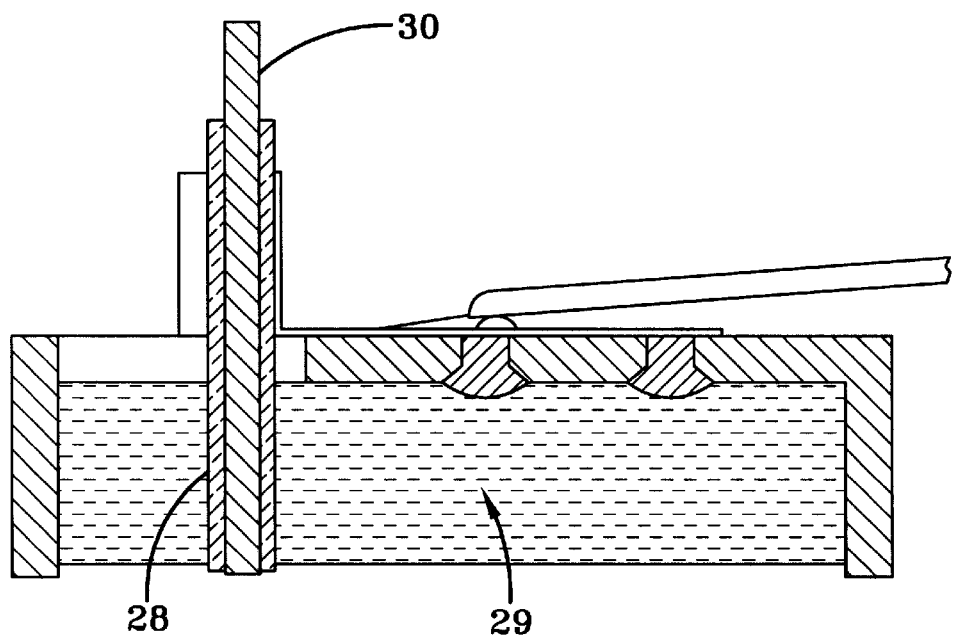
FIG. 3b is a side elevational view of the liquid dielectric capacitor of the present invention.

For thin lubricant films, $h_{lubricant} < 10$ nm, $C_p$ dominates the capacitance measurement; surface roughness and curvature prevent complete wetting of the slider rails and $A_w$ is much less than the total area of the slider. For thick films, h>50 nm, the lubricant dominates the measured capacitance, and the second equation above may be simplified to allow a calculation of absolute film thickness based solely on the properties of the lubricant The second capacitance embodiment developed to map lubricant films preferably uses a metal pin suspended in a hollow PTFE slider filled with a liquid with a high dielectric constant. By using this technique, the surface of the pin may be completely wetted and the parallel capacitance term in the above equations may be removed. A liquid dielectric capacitor is illustrated in FIG. 3. A PTFE slider 25 may be attached to a flexure 27 and load arm 26 from a full size commercial slider with a methyl cyanoacrylate adhesive. The overall dimension of the PTFE slider may be 3 mm×3 mm×10 mm. The dimension of the chamber holding the liquid may be 1.5 mm×2.25 mm×8.5 mm. An arrangement of three pads on the base of the slider may provide stable orientation of the pin relative to the disk. The pin 30, which may be made from platinum or stainless steel, may be surrounded by a glass tube 28 to isolate the pin 30 from the slider suspension 29. Typical pin-disk separation is preferably about 10 $\mu$m. A variety of pin diameters may be used ranging between 0.1 mm and 1.0 mm. The liquid dielectrics may displace nonpolar lubricants while polar lubricants are unaffected by the liquid. Therefore, this technique may be preferable for polar lubricants while the slider based technique works for any lubricant.

The reason for using a liquid dielectric can best be illustrated by modeling the interface as a parallel plate capacitor 19, as shown in FIG. 2b. The capacitance measured between the conducting pin 20 and disk substrate 24, $C_m$, is equivalent to three capacitors in series: one of these capacitances is due to the liquid, $C_{water}$; one is due to the lubricant, $C_{lubricant}$; and one is due to the carbon overcoat, $C_{carbon}$ $$\frac{1}{C_m} = \frac{1}{C_{water}} + \frac{1}{C_{lubricant}} + \frac{1}{C_{carbon}}$$
$$= \frac{1}{A\varepsilon_o}\left(\frac{h_{water}}{\varepsilon_{water}} + \frac{h_{lubricant}}{\varepsilon_{lubricant}} + \frac{h_{carbon}}{\varepsilon_{carbon}}\right)$$

where A is the area of the pin 20, $h_{water}$, $h_{lubricant}$, and $h_{carbon}$ are the thicknesses of the respective liquid 21, lubricant 22 and carbon 23 layers, and $\in_{water}$, $\in_{lubricant}$, and $\in_{carbon}$ are the dielectric constants corresponding to these layers. If $\in_{water}$ is sufficiently large, the term due to the liquid will be small in comparison to the other terms and the capacitance measurement will be dominated by properties of the lubricant and carbon overcoat. Both water and ethylene glycol, with reported dielectric constants of 78 and 40 at 25° C. respectively, gave good a small volume fraction of lubricant, 0.1–1.0%. After the disk is raised from the bath and the solvent evaporates, a thin film of lubricant remains. The thickness of the deposited lubricant depends on the rate of withdrawal and lubricant concentration in the solvent, increasing with increasing withdrawal rate and lubricant concentration. For the 0.1% solution, withdrawal rates ranging between 4 mm/s and 16 mm/s produced films ranging between 2 and 10 nm thick, respectively. With a 1.0% solution, a withdrawal rate of 1 mm/s produced a 75 nm thick film. In the drain coating process, withdrawal of the disk from the bath may be achieved by draining the container at a constant rate. The advantage of this process over drain coating is that no mechanical noise is transmitted to the bath during withdrawal. Mechanical vibrations produce small waves in the solvent bath, resulting in an inconsistent lubricant film thickness.

Some of the disks coated with the polar lubricant were given a thermal treatment to bond the lubricant to the carbon overcoat. The thermal treatment consisted of baking the disk at 150° C. for 1 hour. After thermal treatment the lubricant is partially bonded: there is a 1–2 nm thick film of lubricant fully bonded to the carbon overcoat while on top of this lubricant there is a layer of unbonded lubricant. Washing the disk with FC-72 solvent after the thermal treatment may remove the unbonded fraction of lubricant and leave a disk with fully bonded lubricant.

Straight Rail Microslider Measurements. In the first effort to profile thin lubricant films, a method which had been used successfully to make high shear rate viscosity measurements was adapted. In high shear rate viscosity measurements a thin lubricant film is sheared resolution of the lubricant film. The effective dielectric constants of these liquids proved to be substantially higher during the measurements, due most likely to contamination.

Materials and Methods

Figure 4A:
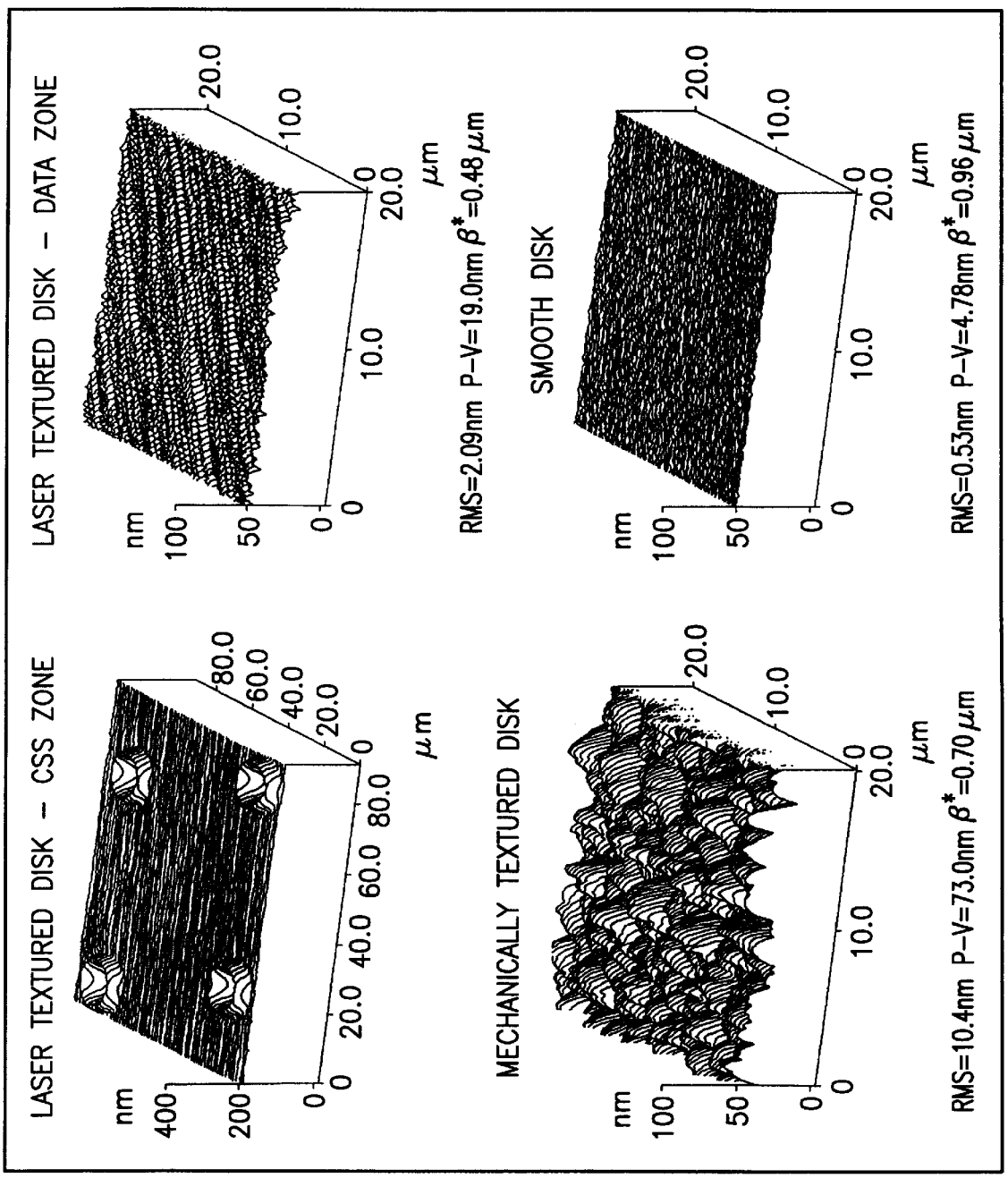
FIG. 4 shows AFM images of a) the disks examined with corresponding surface roughness values, and b) the ABS of a microslider used in lubricant mapping and drag tests of the present invention.
Figure 4B:
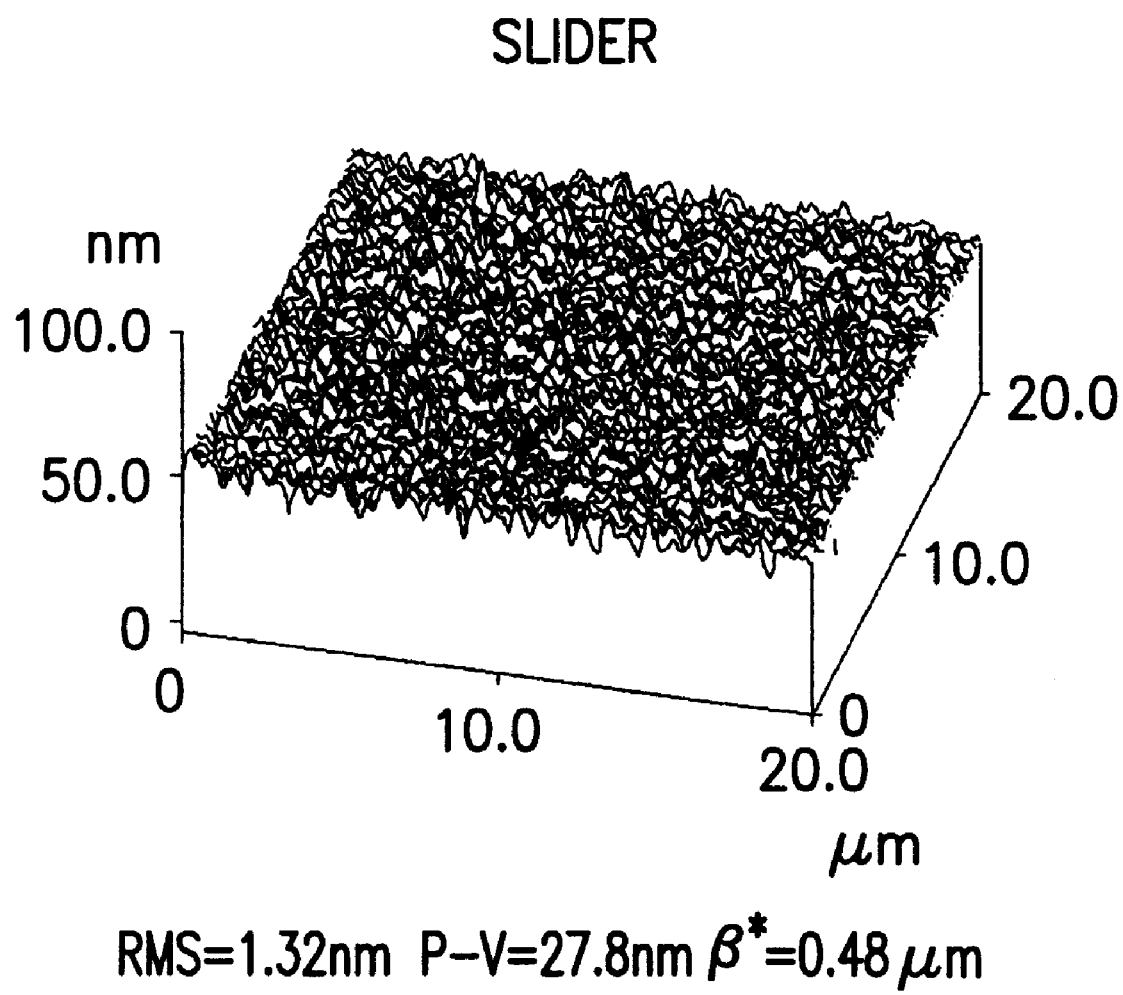

Test Materials. The disks used were 95 mm in diameter and had an amorphous carbon overcoat approximately 10 nm thick. These disks had three different surface textures: smooth, mechanically textured and laser textured. Atomic force microscope (AFM) profiles of all three types of disks are given in FIG. 4a along with values for RMS surface roughness, peak-to-valley distance, P–V, and correlation length, β*. The laser-textured disks have a smooth data zone from the outside radius to the contact-start-stop (CSS) zone at the inside radius of 19.5 mm. The slider is parked in the CSS zone and this region is textured with donut shaped bumps to reduce stiction during slider take off. Straight rail $Al_2O_3$—TiC microsliders were used in all of the drag tests and some of the capacitance measurements. An AFM image of the slider air-bearing surface (ABS) is given in FIG. 4b along with surface roughness values. Three types of per-fluoropolyether (PFPE) lubricants were used: a straight chain lubricant with intermediate viscosity, Fomblin Z-15; a lubricant with side groups and high viscosity, Fomblin YR; and a lubricant with polar end groups and low viscosity, Forriblin Z-DOL. Ausimont manufactures all three lubricants. The two non-polar lubricants were used in capacitance measurements with the microslider while the polar lubricant was used in all measurements with the liquid dielectric capacitor.

Figure 5:
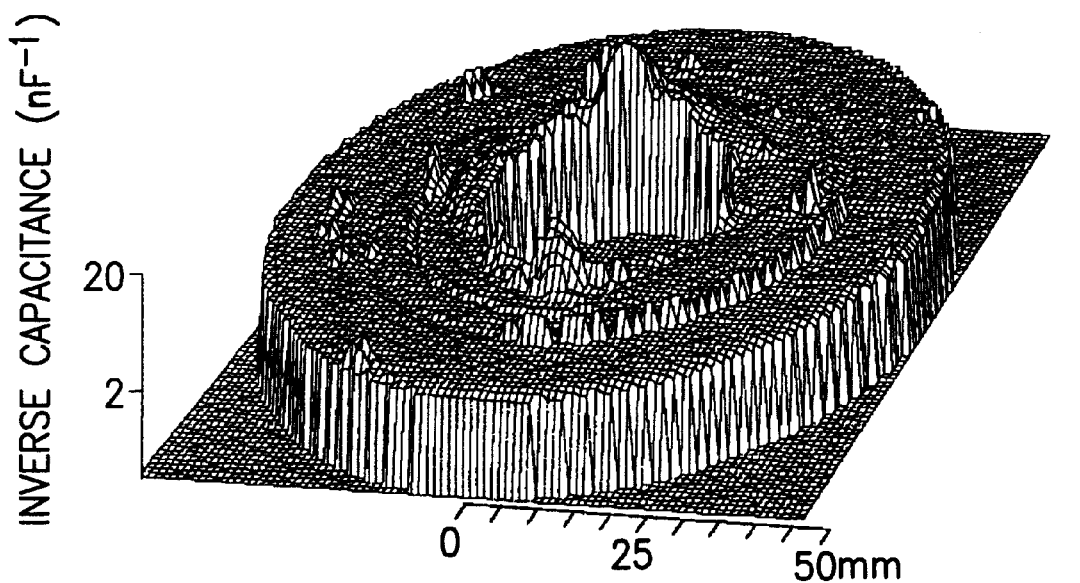
FIG. 5 shows AFM images comparing a) inverse capacitance with b) friciton measurements from a microslider on a smooth disk coated with 4 nm of Z-15, as disclosed in the present invention.
Figure 5:
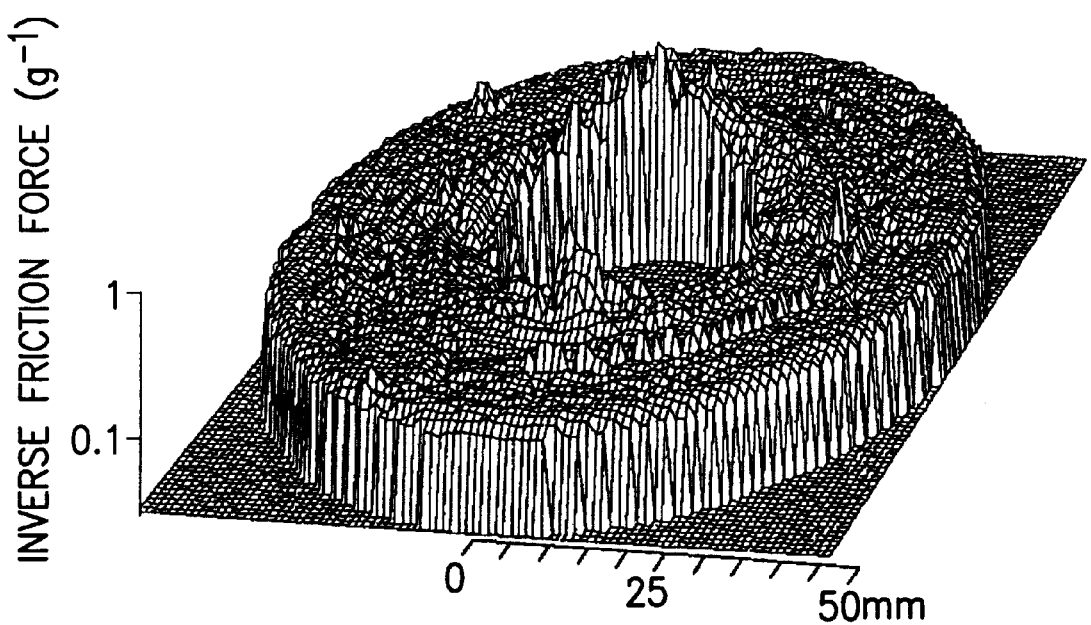
Figure 6:
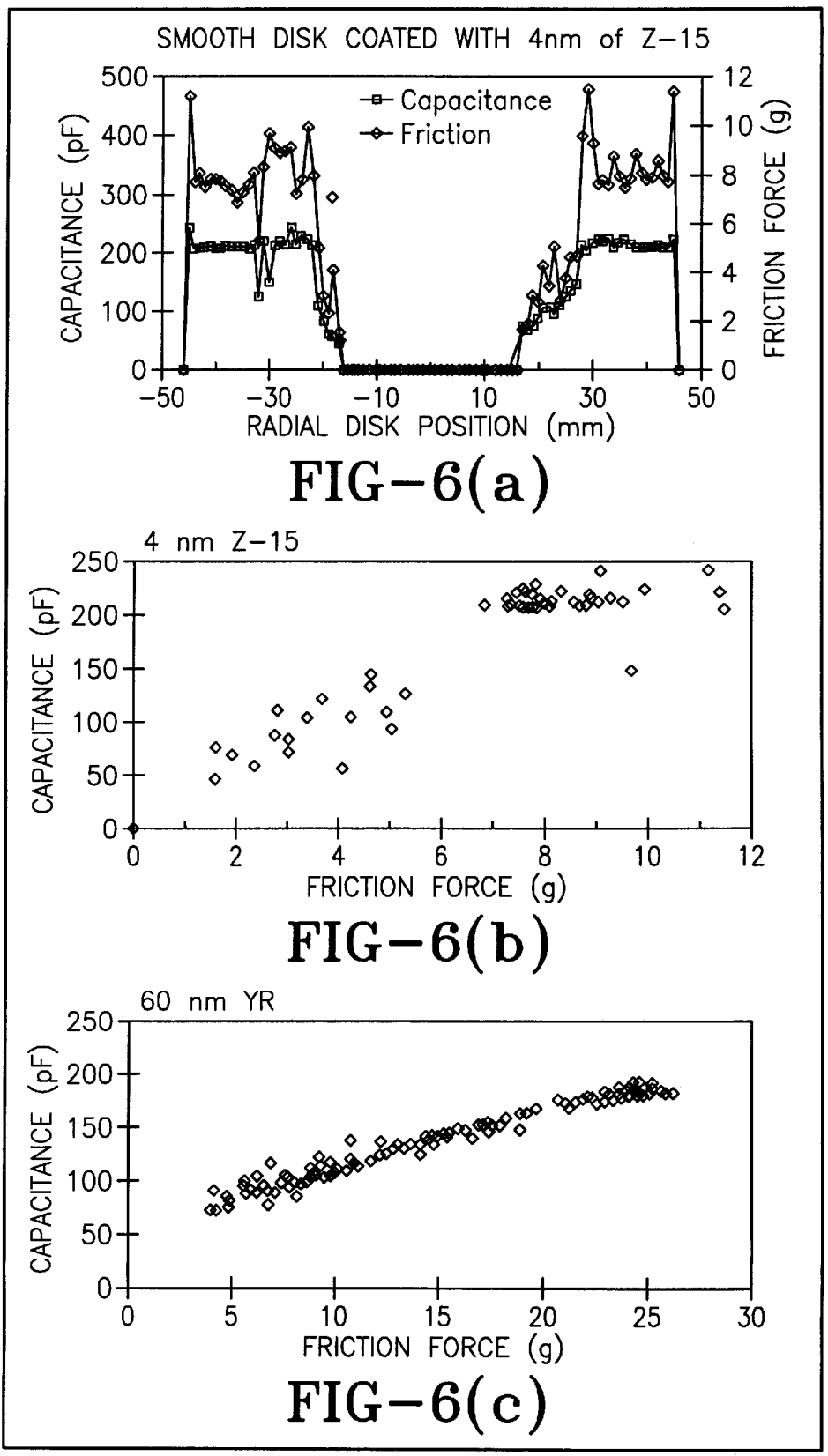
FIG. 6 shows a) a graphical comparison of the friction force with the capacitance measurement of the present invention across the diameter of a smooth disk coated with 4 nm of Z-15. b) a plot of the capacitance from a) as a function of the friction force, showing weak correlation and c) a plot of the capacitance as a function of friction force for a disk coated with 60 nm YR, showing strong correlation.

Two methods were used to lubricate the disks, dip coating and drain coating. In dip coating the disk may be dipped into a solvent bath, such as Fluorinert FC-72, (3M) containing between a commercial slider and a polished disk. The friction force is measured and the film thickness is calculated from a capacitance measurement between the slider and the disk. Measurements of friction force and capacitance made on a smooth disk coated with 4 nm of the PFPE Z-15 are shown in FIG. 5. In this measurement the slider was started at an outside radius of 46 mm and moved radially inward 1 mm per disk revolution to an inside radius of 18 mm. In FIG. 5 the inverse of the capacitance and friction force measurements are plotted, both of which should be proportional to the film thickness. As can be seen, there is some correlation between the two measurements. This is further exemplified in FIG. 6a which directly compares these measurements across the diameter of the disk. Unfortunately, the correlation is too poor to declare this particular type of measurement an adequate means of characterizing thin lubricant films. This is shown in FIG. 6b where the capacitance values of FIG. 6a are plotted as a function of the friction force. The scatter in this plot indicates that the first and second equations above do not adequately describe the friction and capacitance at the slider-disk interface for thin films. The reason for this is most likely due to the crown and surface roughness of the slider used. The surface roughness of the slider, RMS=1.5 nm, is of the order of the film thickness while the slider crown, 40 nm, is much greater than the film thickness. As a result of this, only a small fraction of the slider is wetted by the lubricant and the capacitance $C_p$ dominates the measurement. While there is some relation between the capacitance, friction force, and film thickness, the relationship is too weak to give a good film thickness measurement. In cases of thick lubricant films, where the surface roughness and crown of the slider are less then the film thickness, the first two equations are valid. This is indicated by FIG. 6c where friction force is plotted against capacitance for a 60 nm thick YR lubricant film.

Liquid Dielectric Capacitor Measurements. In most of the measurements a capacitance map of the disk surface was generated from an outside radius of 46 mm to an inside radius of 18 mm. While the slider design used has good stability in the direction of sliding, stability perpendicular to the direction of sliding is poor due to the narrow width of the slider. Poor slider stability perpendicular to the direction of sliding can produce erroneous capacitance measurements during and shortly after radial positioning of the slider due to the extreme sensitivity of the capacitance measurement to pin-disk orientation. For this reason the radial position of the slider is kept constant during measurement. Once per revolution the slider is moved radially inward 0.9 mm, resulting in the measurement of 31 tracks between the outside and inside radius. While the slider is moving inward, no capacitance measurement is made. This, along with the misalignment of the pin relative to the disk immediately after radial positioning, causes the radial line to be visible in many of the lubricant maps.

A plot of a raw capacitance measurement is shown in FIG. 7. In this capacitance measurement, the slider was tracked from the outside radius to the inside radius. In measurements where the slider moved from the inside radius to the outside radius, the minimum capacitance occurred at the inside, indicating that the radial dependence in the capacitance may be due to a change in the effective dielectric constant of the liquid and is dependent on the history of the dielectric. The rate of change in dielectric constant is independent of pin size or material and most likely can be attributed to absorption of impurities from the disk surface. If a single track is measured continuously, the capacitance at a point on the disk with a given angular position drifts by a few tenths of a percent per disk revolution. An averaging technique may be used to eliminate the drift in capacitance. For each track an average value of the capacitance may be determined, $\overline{C}$. Every measured capacitance, $C_m$, for that track is then divided by the average value, producing the normalized capacitance $C_m/\overline{C}$. Using this method on the raw capacitance measurement shown in FIG. 7a produces the result shown in FIG. 7b. This averaging technique works well in cases where the average lubricant film thickness is the same for every track. An independent measurement of film thickness using some other method such as ellipsometry must be made to calibrate the capacitance measurement. In most cases, a single point measurement is sufficient for calibration because of the nature of the lubrication process: a radial variation in film thickness is not expected and mean film thickness is constant for each track. However, if this is not true, a point measurement of film thickness may be required for each track.

From calibration measurements made with an ellipsometer, the inverse of the normalized capacitance, $\overline{C}/C_m$, was found to be proportional to the film thickness, consistent with the parallel plate capacitor model given. In FIG. 8a a map is shown for a disk with the lubricant film thickness increasing across the diameter. The variation in film thickness was produced by linearly increasing the withdrawal rate as a function of time during the dip coating process. Ellipsometer measurements made along the line indicated in FIG. 8a are shown in FIG. 8b as open squares. The solid line in FIG. 8b is a fit of the inverse of the capacitance measurement, $\overline{C}/C_m$, to the ellipsometer measurement using a linear function $$h = \overline{h}\left[a_s\left(\frac{\overline{C}}{C_m} - 1\right) + 1\right]$$

where h is the film thickness and $\overline{h}$ and $a_s$, are scaling constants. The constant $a_s$ depends on the geometric and dielectric properties of the interface: namely, carbon overcoat thickness, pin-disk spacing, and dielectric constants of the carbon and lubricant. In this fit $a_s$=0.9 and $\overline{h}$=3.1 nm; the fitted $\overline{h}$ is very close to the measured mean lubricant thickness of 3.2 nm. These values indicate that in cases where there are several nm of lubricant on the disk, the above equation can be approximated by $$h = \overline{h}\frac{\overline{C}}{C_m}$$

with h taken as the mean film thickness. With this approximation, no independent measurement is necessary to determine the percent variation in h and in cases where there is only a small variation in film thickness, an ellipsometer measurement at a single point is sufficient to determine $\overline{h}$.

Figure 9:
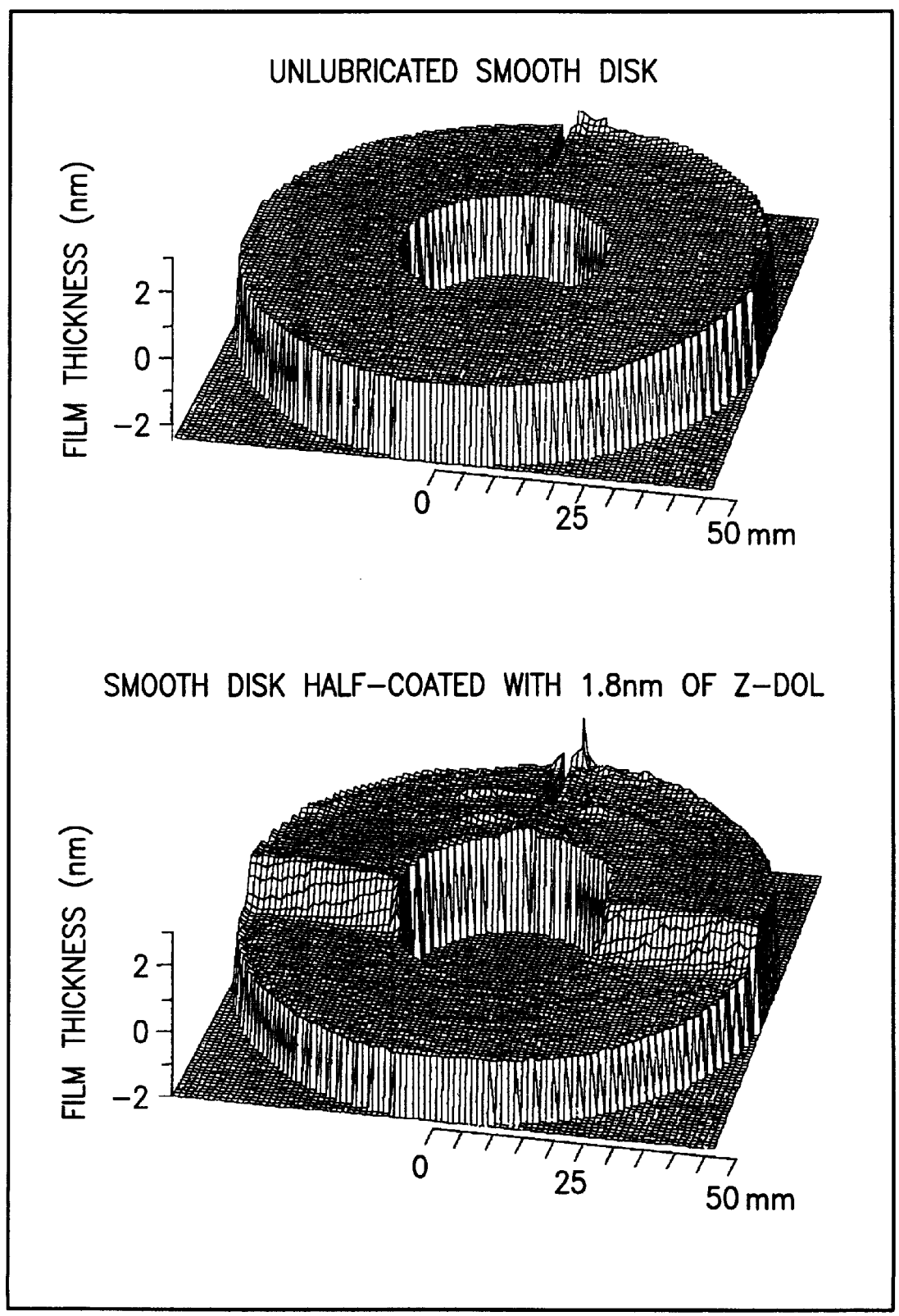
FIG. 9 shows a) a perspective graphical representation of a capacitance measurement, taken in accordance with the present invention, of an unlubricated smooth disk, and b) a lubricant film thickness map of a smooth disk half coated with 1.8 nm of fully bonded lubricant.

The carbon overcoats on the disks proved to be extremely uniform, and any variation in the overcoat thickness on the disks had negligible effect on film thickness measurements. This is shown in FIG. 9a by $\overline{C}/C_m$ for an unlubricated disk. The greatest variation of the capacitance from the mean was less then 5% for this disk. In FIG. 9b a lubricant thickness map is given for a disk half coated with 1.8 nm of fully bonded lubricant. This figure allows a direct comparison between the bare carbon and a lubricant film and indicates that the slight variation in carbon thickness is negligible in comparison to variations in lubricant thickness as small as 0.1 nm.

Figure 10:
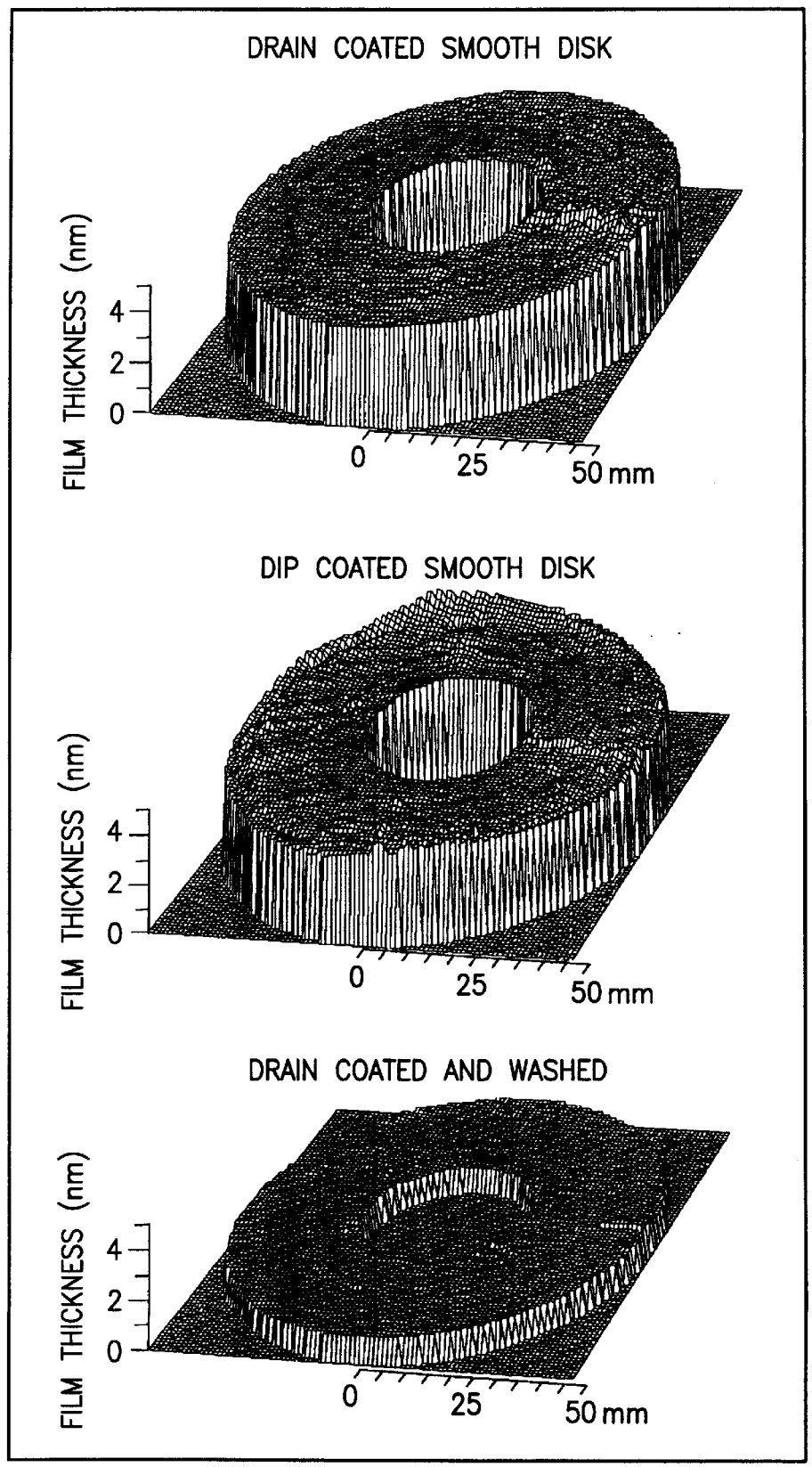
FIG. 10 shows a perspective graphical comparison of the uniformity of film thickness in a) a drain coated smooth disk, b) a dip coated smooth disk, and c) a drain coated and washed smooth disk.

In FIG. 10 a comparison is made between dip coated and drain coated disks. Both disks are coated with partially bonded lubricant and have an average film thickness of approximately 4 nm. The direction of draining for the drain coated disk is from left to right in the figure. The film thickness increases from 4 nm at the left of the disk to 4.4 nm at the right. This increase can be attributed to a decreasing evaporation rate of solvent at the disk-solvent bath-air interface as the solvent level drops in the container and the air in the container becomes increasingly saturated with evaporated solvent. Decreasing the evaporation rate is equivalent to increasing the drain rate. The dip coated disk in FIG. 10, with $\overline{h}$=4.3 nm, was withdrawn from the solvent bath from top to bottom in the figure. The most striking feature in this lubricant map is the 5 nm ridge of lubricant at the top of the disk. This ridge is due to poor control of the withdrawal rate. The series of horizontal striations are due to small waves in the bath produced by mechanical vibrations during withdrawal. The lubricant map at the bottom of FIG. 10 is of the drain coated disk after washing with solvent, resulting in the film thickness $\overline{h}$=1.2 nm.

Figure 11:
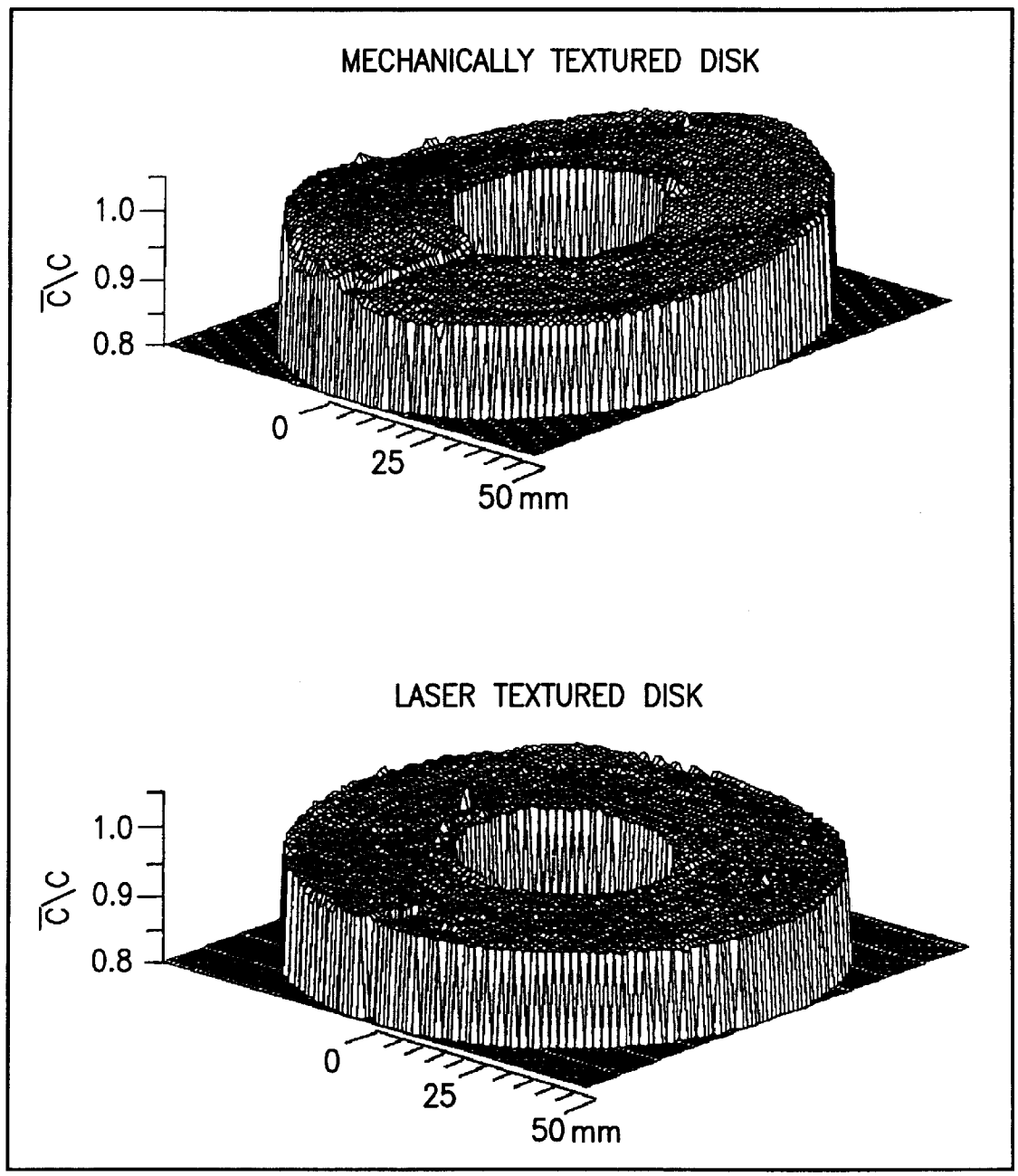
FIG. 11 shows a perspective graphical comparison of the film thickness uniformity of a) a mechanically textured commercial disk and b) a laser textured commercial disk.

One of the greatest strengths of the liquid dielectric capacitance measurement is that it allows a declaration of the quality of the combined lubricant/carbon overcoat layer with no knowledge of the dielectric constant or thickness of either layer. This is illustrated in FIG. 11 where maps of $\overline{C}/C_m$ for a mechanically textured disk and a laser textured disk lubricated by the vendor are given. The variation in $\overline{C}/C_m$ for the mechanically textured disk is a approximately 10% while the variation in $\overline{C}/C_m$ for the laser textured disk is approximately 3%, indicating a variation of at least 10% and 3% in the lubricant/carbon thickness for these disks, respectively.

Lubricant Depletion/Displacement Measurements. A series of capacitance measurements were performed to characterize lubricant depletion due to sliding contact and subsequent recovery. Drag tests were conducted using straight rail microsliders on mechanically textured disks. The disks were coated with either 2.7 nm of partially bonded Z-DOL or 1.3 nm of fully bonded Z-DOL. Relative slider-disk velocity was fixed at 1 m/s with a normal load of 15 g. A drag test was run until the friction force was twice its initial value, at which point a capacitance measurement was made of the wear track. Additional capacitance measurements were made after the initial measurement to document lubricant recovery. The drag tests produced no noticeable wear in the carbon overcoat. A 0.1 mm diameter pin was used in the capacitor and the radial step size was set at 0.1 mm.

Figure 12:
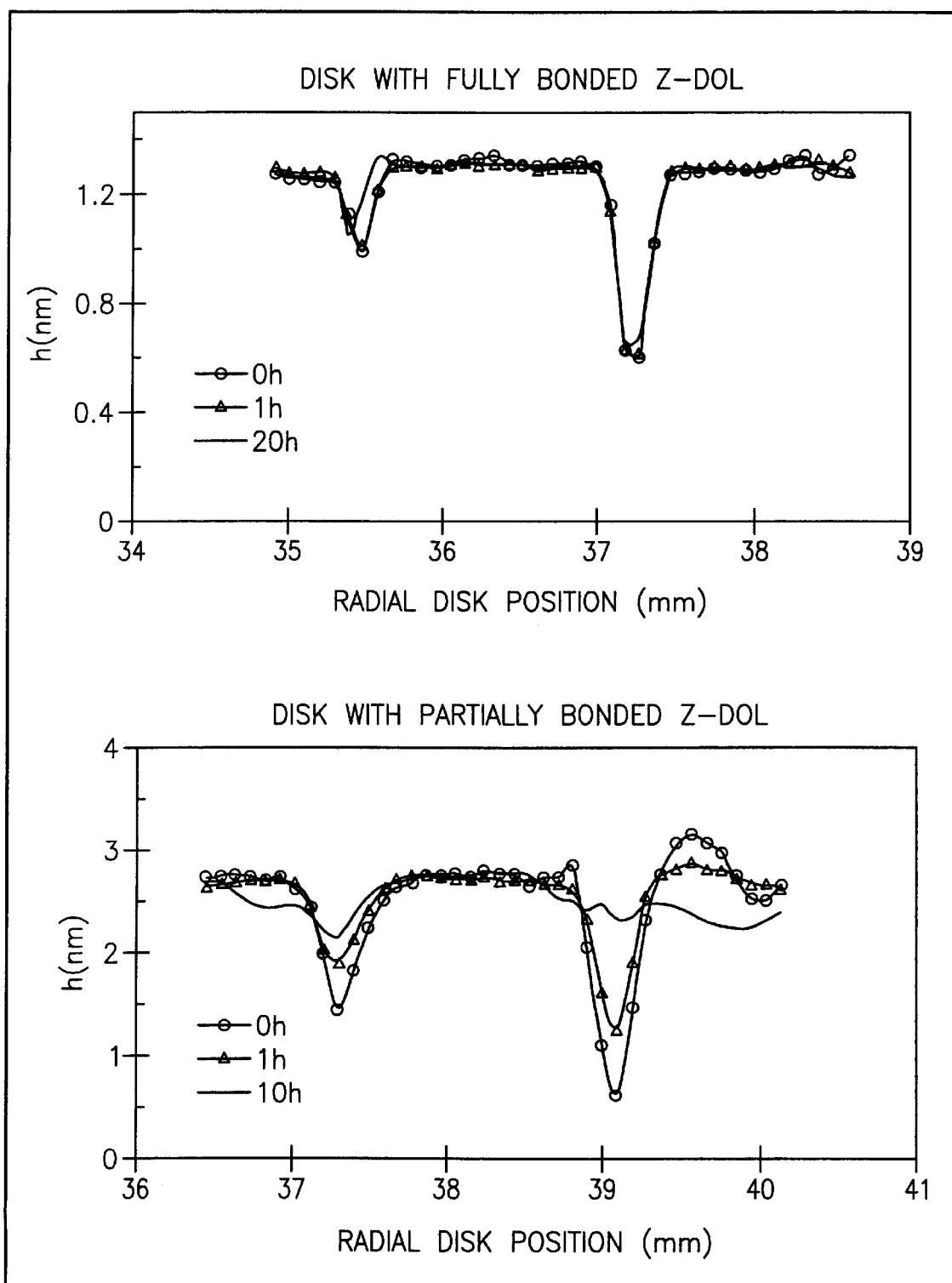
FIG. 12 shows a graphical representation of wear track profiles after a drag test at 1 m/s with a normal load of 15 g on a microslider after a) 23,000 cycles on 1.3 nm of fully bonded Z-DOL after 0, 1 hour, and 20 hours, showing no recovery, and b) after 120,000 cycles on 2.7 nm of partially bonded Z-DOL after 0, 1 hour, and 10 hours, showing recovery.

Film thickness profiles across the wear tracks are shown in FIG. 12. FIG. 12 shows a film thickness profile in a fully bonded lubricant after a drag test was run for 23,000 cycles. Wear tracks are clearly visible at the points of contact between the slider rails and disk. The width of these tracks, 0.5 mm, is approximately the width of the slider rails, 0.33 mm. The difference in the wear depth at the two tracks is most likely due to unequal loading of the slider. Subsequent measurements at 1 hour and 20 hours show negligible recovery of the lubricant film. FIG. 12 also shows a film thickness profile in a partially bonded lubricant film. This test required 120,000 cycles to produce lubricant depletion comparable to that in the fully bonded lubricant. The higher number of cycles can be attributed to the mobile fraction of lubricant: lubricant flows back into the rail region nearly as fast as it is displaced or depleted. The initial film thickness measurement, plotted as empty circles in FIG. 12, indicates that lubricant has been displaced at the outside rail as evidenced by the two bumps on either side of the rail region. Subsequent measurements at 1 hour and 10 hours show lubricant recovery as the mobile fraction of lubricant flows back into the rail region. A drag test was also conducted on a partially bonded lubricant film 4 nm thick. No substantial increase in friction had occurred when the test was discontinued at 500,000 cycles and no measurable wear track was generated.

Figure 13:
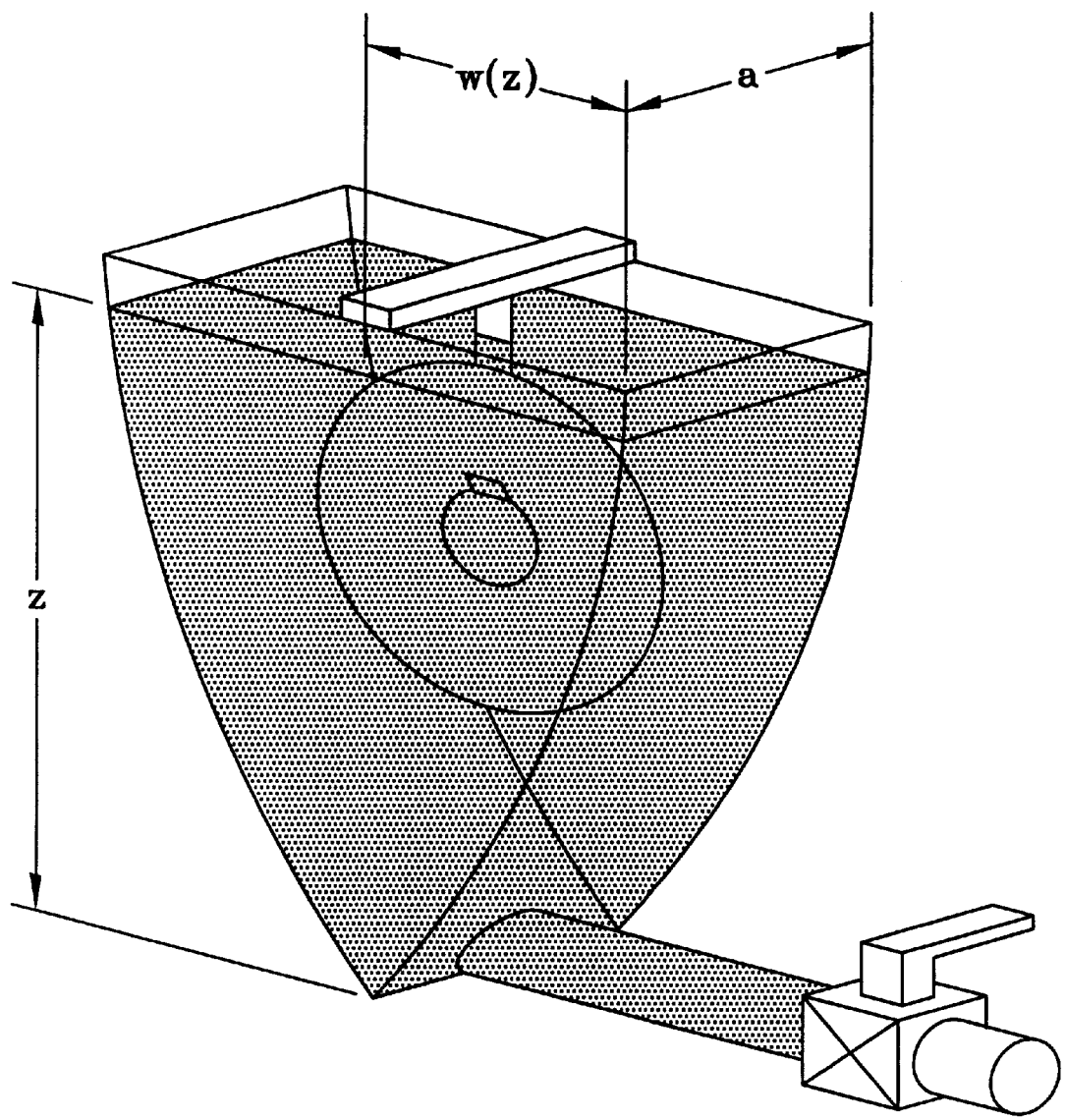
FIG. 13 is a plan view of a drain coater in accordance with the present invention.

Drain Coater Design. In the design of the drain coater, the shape of the chamber was chosen to match the flow characteristics of the outlet so that the rate at which the solvent level fell in the chamber was constant. An illustration of the design is given in FIG. 13. The type of outlet used was a smooth walled pipe. For a liquid filling the chamber to a height z, the pressure at the outlet, $\Delta P$ is $$\Delta P = \rho g z$$

where $\rho$ is the mass density of the solvent and g is the acceleration due to gravity. Using the Blasius friction equation, the pressure drop across the pipe for turbulent flow ($4000 \leq Re \leq 10^5$) is described by $$\Delta P = 0.1582 \eta_o^{1/4} \rho^{3/4} L D^{-5/4} \bar{v}^{7/4}$$

where $\eta^o$ is the absolute viscosity of the solvent, L and D are the length and diameter of the pipe, $\bar{v}$ is the mean flow velocity in the pipe, and Re is Reynolds number, $Re = \rho \bar{v} D / \eta_o$. The volume flow rate, $\dot{V}$, through a surface located at z is equal to the flow rate through the pipe $$\dot{V} = 2w(z)a\frac{dz}{dt} = \pi\frac{D^2}{4}\bar{v}$$

where w(z) is the width of the chamber at z, a is the thickness of the chamber, and dz/dt, the rate at which the surface level falls, is constant. By combining the previous three equations, the width of the chamber as a function of z can be determined $$w(z) = z^{4/7}\left[\frac{1.13 D^{19/7} g^{4/7} \rho^{1/7}}{\eta_o^{1/7} L^{4/7} a \frac{dz}{dt}}\right]$$

The term in brackets can be used as a scaling constant to produce a chamber with convenient dimensions to fit the disk. The depth and cross sectional area of the chamber at the bottom of the disk should be set so that the turbulent flow requirement is met. The pipe length and diameter can be adjusted to produce a specific dz/dt, subject also to the constraint on Re.

Figure 14:
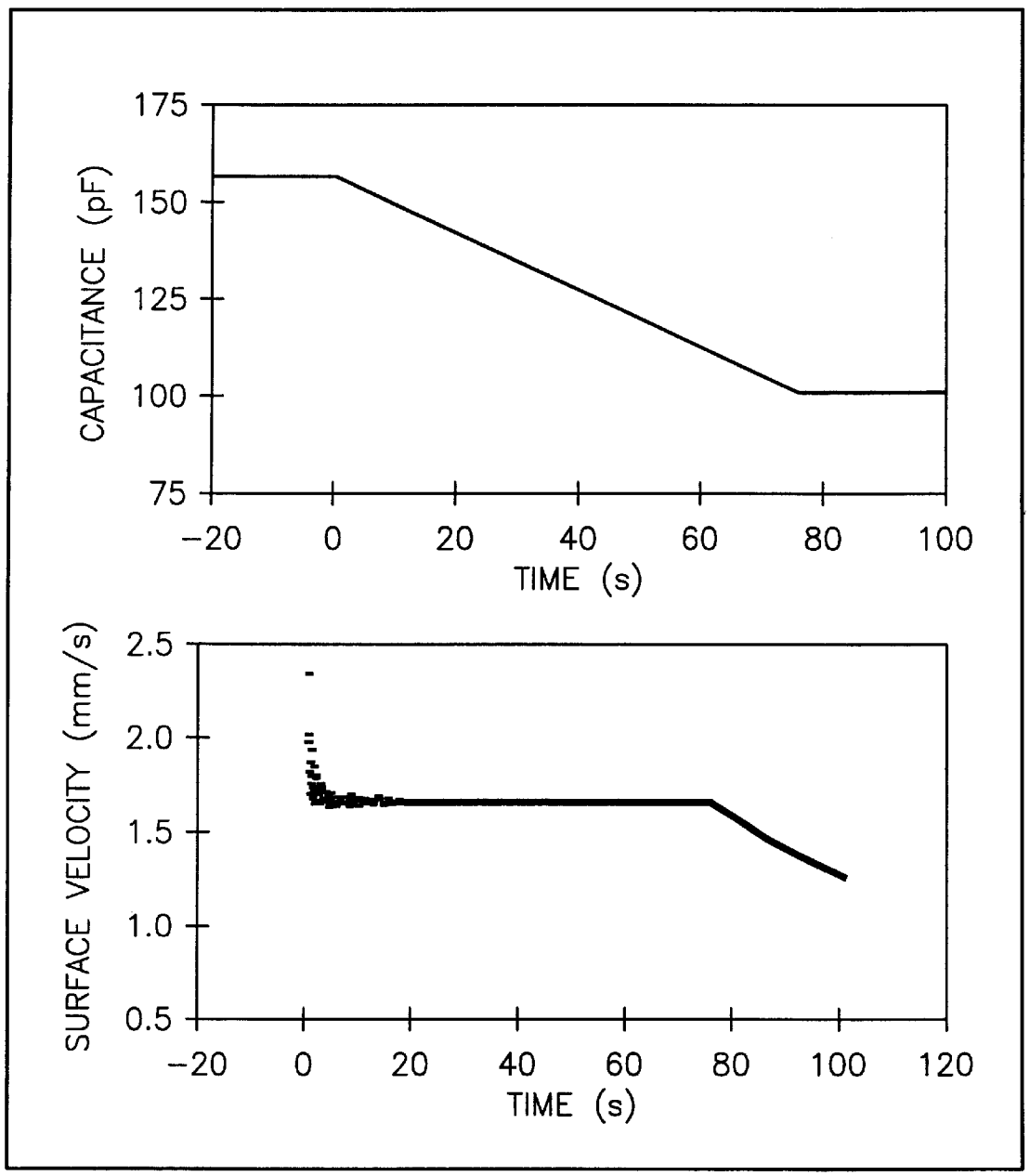
FIG. 14 is a graphical representation of a) a capacitance measurement in accordance with the present invention from a surface level indicator while the chamber is being drained, and b) the derivative of the capacitance measurement, indicating surface level drops at a constant velocity.

The surface velocity dz/dt was measured by immersing a concentric cylinder capacitor in the solvent and measuring its capacitance as a function of time. The capacitor consists of two concentric cylinders separated by nylon spacers. Holes drilled through the outer cylinder permits liquid to flow in to and out of the volume between the two cylinders. The solvent fills the volume between the cylinders and the measured capacitance between the cylinders is proportional to the volume filled. As the chamber is drained the time rate of change of the capacitance is proportional to the surface velocity $$\frac{dC}{dt} = \left[\frac{C_e - C_f}{L_C}\right]\frac{dz}{dt}$$

where $C_e$ is the capacitance when the capacitor is empty, $C_f$ is the capacitance when the volume between the cylinders is completely filled with solvent, and $L_c$ is the length of the capacitor when filled with solvent. A plot of the capacitance as a function of time as the chamber is drained is given in FIG. 14. The surface velocity is constant within the measurement accuracy of the capacitance meter (0.2%) as shown in FIG. 14 where surface velocity is plotted as $$\frac{dz}{dt} = \frac{C}{t}\frac{L_C}{(C_e - C_f)}$$

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

References

1. B. Bhushan, *Tribology and Mechanics of Magnetic Storage Devices*, second ed., Springer-Verlag, New York.
2. V. J. Novotny and M. A. Baldwinson, J. Appl. Phys. 70, 5647 (1991).
3. W. C. Leung, W. Crooks, H. Rosen and T. Strand, IEEE Trans. Magn. 25, 3659 (1989).
4. S. W. Meeks, W. E. Weresin and H. J. Rosen, Trans. ASME 117, 112 (1995).
5. U. Jonsson and B. Bhushan, J. Appl. Phys. 78, 3107 (1995).
6. C. D. Hahm and B. Bhushan, J. Appl. Phys. 81, 5384 (1997).
7. Y. Hu and F. E. Talke, ASLE SP-25, 43 (1988).
8. V. J. Novotny, T. E. Karis and N. W. Johnson, ASME J. Tribology 114, 61 (1992).
9. F. W. White, *Viscous Fluid Flow*, second ed., McGraw-Hill, New York.

The foregoing references are hereby incorporated herein by reference.

What is claimed is:

1. A film thickness measurerment device comprising:
   a motion-capable platform for supporting a conductive material, said motion-capable platform adapted for rotational motion;

a conductive probe located near said conductive material on said motion-capable platform so as to produce a measurable capacitance therebetween, said conductive probe comprising a conductive pin immersed in a contained liquid dielectric; and a capacitance measuring device adapted to measure capacitance between said conductive material and said conductive probe while said conductive material is in motion with respect to said conductive probe.

2. A film thickness measurement device according to claim 1 additionally comprising a force transducer adapted to measure friction and normal forces applied to said conductive probe.

3. A film thickness measurement device according to claim 1 wherein said conductive probe is adapted to move along a predetermined path over a region of said motion-capable platform.

4. A film thickness measurement device comprising:

a motion-capable platform for supporting a film-coated conductive substrate, said motion-capable platform adapted for rotational motion;

a conductive probe located near said film-coated conductive substrate so as to produce a measurable capacitance therebetween, said conductive probe comprising a conductive pin immersed in a contained liquid dielectric; and a capacitance-measuring device adapted to measure capacitance between said film-coated conductive substrate and said conductive probe while said conductive substrate is in motion with resect to said conductive probe.

5. A film thickness measurement device according to claim 4 additionally comprising a force transducer adapted to measure friction and normal forces applied to said conductive probe.

6. A film thickness measurement device according to claim 4 wherein said conductive probe is adapted to move along a predetermined path over a region of said motion-capable platform.

\* \* \* \* \*

UNITED STATES PATENT AND TRADEMARK OFFICE
CERTIFICATE OF CORRECTION

PATENT NO.     : 6,504,386 B1
DATED          : January 7, 2003
INVENTOR(S)    : Bharat Bhushan et al.

It is certified that error appears in the above-identified patent and that said Letters Patent is hereby corrected as shown below:

<u>Column 12,</u>
Line 64, please delete the word "measurerment" and replace it with -- measurement --.

Signed and Sealed this

Tenth Day of June, 2003

JAMES E. ROGAN
*Director of the United States Patent and Trademark Office*